United States Patent [19]

Ray-Chaudhuri et al.

[11] 4,215,209
[45] Jul. 29, 1980

[54] ANAEROBIC CURING COMPOSITION AND PROCESS FOR PREPARING SAME

[75] Inventors: Dilip K. Ray-Chaudhuri, Bridgewater; Eric A. Meier, North Brunswick, both of N.J.

[73] Assignee: National Starch and Chemical Corporation, Bridgewater, N.J.

[21] Appl. No.: 50,988

[22] Filed: Jun. 22, 1979

[51] Int. Cl.$^2$ ............................................. C08F 22/14
[52] U.S. Cl. ..................... 526/292; 526/220; 526/279; 526/281; 526/301; 526/304; 526/312; 526/320; 526/323.1; 526/323.2
[58] Field of Search ............... 526/292, 279, 301, 304, 526/312, 320, 323.1, 323.2, 220, 281

[56] References Cited
U.S. PATENT DOCUMENTS

| | | |
|---|---|---|
| 2,628,178 | 2/1953 | Burnett et al. |
| 3,483,208 | 12/1969 | Bahr et al. ............................ 526/220 |
| 3,795,641 | 3/1974 | Lees et al. |
| 3,985,943 | 10/1976 | Gruber et al. |
| 4,038,475 | 7/1977 | Frauenglass et al. |

*Primary Examiner*—Harry Wong, Jr.
*Attorney, Agent, or Firm*—James & Franklin

[57] ABSTRACT

Improved storage-stable anaerobic curing adhesive compositions useful as anaerobic adhesives and sealants are prepared by first mixing a polymerizable acrylate ester monomer, an inhibitor for free radical polymerization, a chelator, and at least an effective amount of an accelerator system consisting of an N-substituted sulfonamide and an aromatic tertiary amine. The resultant homogeneous mixture is thereafter maintained at a temperature of at least about 20° C. for a period of time sufficient to provide the composition with anaerobic curing properties and a specified minimum amount of active oxygen. In one embodiment, the mixture is stirred at a temperature of 45°–80° C. for 10–30 hours. In another embodiment, the mixture is maintained at an elevated temperature without stirring.

14 Claims, No Drawings

ANAEROBIC CURING COMPOSITION AND PROCESS FOR PREPARING SAME

BACKGROUND OF THE INVENTION

1. Field of the Invention

This invention relates to storage-stable anaerobic curing adhesive compositions containing polymerizable acrylate ester monomers and to an improved process for the preparation thereof. The compositions are stable for periods of time extending to a half-year or more in the presence of oxygen, buty polymerize (cure) rapidly in the absence of air or oxygen, thereby finding use as anaerobic adhesives and sealants.

2. Description of the Prior Art

Anaerobic curing compositions are well known and described in the prior art. U.S. Pat. No. 2,628,178 describes the preparation of anaerobic adhesives which rely on the oxygenation of certain polyacrylate monomers until at least 0.1% of active oxygen is introduced into the monomer. The resultant oxygenated adhesive composition is then stored in contact with a continuous current of air or oxygen until polymerization is desired (at which time polymerization is initiated by the absence of air). This process therefore has the disadvantage that it is totally unsuited to the preparation and distribution of small quantities of adhesive sealants, since it is clearly impracticable to maintain a constant supply of air or oxygen to a large quantity of containers over an extended period of commercial conditions.

U.S. Pat. No. 3,795,641 to Lees et al. teaches that such constant oxygen supply during storage need not be employed when the monomer is initially oxygenated in the presence of minor amounts of an organic tertiary amine and/or an imido compound. This process, however, suffers from several limitations and the subject invention is considered to be an improvement thereon. Thus, aside from economic considerations, there is a measure of inconvenience in supplying and employing the required oxygen-bearing gaseous stream. Moreover, the oxygenation period itself is relatively lengthy, being measured in days in many instances. Additionally, the resulting adhesive is not characterized by a superior degree of stability and cure speed desired in many commercial products.

Other methods have been developed for rendering monomers to possess anaerobic properties without the necessity for oxygenating the monomers. These methods require the presence of specific polymerization initiators such as organic hydroperoxides, peroxy or perester compounds, sulfones, diazonium salts and the like, as disclosed, for example, in U.S. Pat. Nos. 2,895,950; 3,775,385; 3,957,561 and 4,054,480. Additional patents directed to improvements on the above-mentioned catalyzed systems include, for example, U.S. Pat. No. 4,038,475, which teaches the use of a sulfimide and amine as an accelerator system for the peroxy-initiated polymerization of an unoxygenated monomer, the adhesive being stabilized with a selected quinone and containing a chelating agent.

Although benzosulfimide (saccharin) is the most common sulfimide used as accelerator, the N-substituted sulfonamides as taught in U.S. Pat. No. 3,985,943 may instead be added to the unoxygenated monomer containing a peroxy initiator. However, the resultant anaerobic adhesive is commercially undesirable because of its poor shelf stability.

Accordingly, it is an object of the present invention to provide an anaerobic curing adhesive which does not require the use of externally added polymerization initiators.

It is another object to provide an anaerobic curing adhesive composition which does not require constant passage of gaseous oxygen either during preparation of the adhesive or during storage thereof.

It is an additional object to provide an anaerobic curing adhesive composition which is characterized by superior shelf stability and cure speed and which maintains its high activity upon accelerated aging thereof.

SUMMARY OF THE INVENTION

The above and related objects are achieved in an improved process for preparing an anaerobic curing composition of the type wherein a homogeneous mixture is formed consisting essentially of at least one polymerizable acrylate ester, a free-radical inhibitor, a chelator and an accelerator system, said mixture being maintained at a temperature of at least about 20° C. for a period of time sufficient to provide said composition with anaerobic curing properties and with at least 25 ppm. of active oxygen. The improvement in the process comprises incorporating in the homogeneous mixture as the accelerator system therefor at least an effective amount of an aromatic tertiary amine and a linear N-substituted sulfonamide of the general formula:

wherein the R groups independently represent an unsubstituted or substituted hydrocarbon radical.

The preferred acrylate ester monomers herein are triethyleneglycol dimethacrylate, tetraethyleneglycol dimethacrylate, trimethylolpropane trimethacrylate, hydroxyethyl methacrylate, bis-phenol A dimethacrylate, urethane dimethacrylate, norbornane-substituted acrylates, and mixtures thereof.

While the cyclic sulfimides function satisfactorily as part of the accelerator system for anaerobic adhesives, the above-defined N-substituted sulfonamides are unexpectedly much more effective in enabling the adhesive to maintain high cure speed even upon accelerated aging of the adhesive.

DESCRIPTION OF THE PREFERRED EMBODIMENTS

The monomers employed in accordance with the present process are anaerobically curable monomers having at least one polymerizable acrylate ester group.

The first class of polymerizable monomers useful in the present compositions corresponds to the general formula:

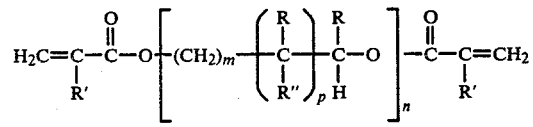

wherein R is selected from the group consisting of hydrogen, methyl, ethyl,

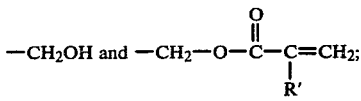

R' is selected from the group consisting of hydrogen, chlorine, methyl and ethyl;

R" is selected from the group consisting of hydrogen, hydroxy, and

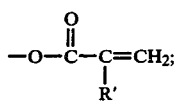

m is an integer of from 1 to 8, and preferably from 1 to 4 inclusive;

n is an integer of from 1 to 20; and p is 0 or 1.

Monomers useful herein and which come within the above general formula include, for example, ethyleneglycol dimethacrylate, ethyleneglycol diacrylate, polyethyleneglycol diacrylate, triethyleneglycol dimethacrylate, tetraethyleneglycol dimethacrylate, trimethylolpropane trimethacrylate, diglycerol diacrylate, diethyleneglycol dimethacrylate, pentaerythritol triacrylate, and other polyether diacrylates and dimethacrylates.

The above class of monomers is in essence described in U.S. Pat. No. 3,043,820.

The second class of polymerizable monomers useful in the present compositions corresponds to the general formula:

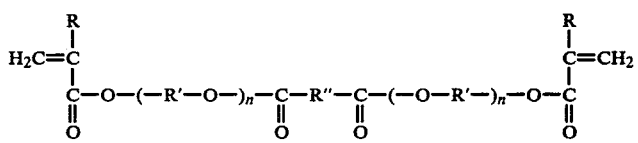

where

R represents hydrogen, chlorine, methyl or ethyl;

R' represents alkylene with 2–6 carbon atoms;

R" represents $(CH_2)_m$ in which m is an integer of from 0 to 8;

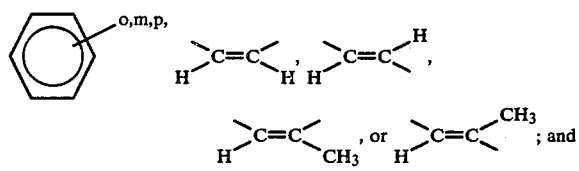

n represents an integer of from 1 to 4.

Typical monomers of this class include, for example, dimethacrylate of bis-(ethyleneglycol) adipate, dimethacrylate of bis-(ethyleneglycol) maleate, dimethacrylate of bis-(diethyleneglycol) phthalate, dimethacrylate of bis-(tetraethyleneglycol) phthalate, dimethacrylate of bis-(tetraethyleneglycol) malonate, dimethacrylate of bis-(tetraethyleneglycol) sebacate, dimethacrylate of bis-(ethyleneglycol) phthalate, dimethacrylate of bis-(tetraethyleneglycol) maleate, and the diacrylates and α-chloroacrylates corresponding to said dimethacrylates, and the like.

The above class of monomers is in essence described in U.S. Pat. No. 3,457,212.

The third class of monomers useful herein are isocyanate-hydroxyacrylate or isocyanate-aminoacrylate reaction products which may be characterized as acrylate-terminated polyurethanes (urethane acrylates) and polyureides or polyureas. These monomers correspond to the general formula:

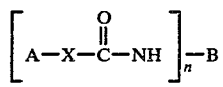

wherein X is selected from the group consisting of —O— and

and R is a member selected from the group consisting of hydrogen and lower alkyl radicals of 1 to 7 carbon atoms; A represents the organic residue of an active-hydrogen-containing acrylate ester wherein the active hydrogen has been removed, the ester being hydroxy- or amino-substituted on the alkyl portion thereof and the methyl, ethyl and chlorine homologs thereof; n is an integer from 1 to 6 inclusive; and B is a mono- or polyvalent organic radical selected from the group consisting of alkyl, alkylene, alkenyl, alkenylene, cycloalkyl, cycloalkylene, aryl, arylene, aralkyl, aralkylene, alkaryl, alkarylene, poly(oxyalkylene), poly(carboalkoxyalkylene), and heterocyclic radicals both substituted and unsubstituted.

Typical monomers of this class include the reaction product of a mono- or polyisocyanate, for example, toluene diisocyanate or methylene bis-phenyl diisocyanate, with an acrylate ester containing a hydroxyl or amino group in the non-acrylate portion thereof, for example, hydroxyethyl methacrylate.

The above class of monomers is in essence described in U.S. Pat. No. 3,425,988.

The fourth class of monomers useful in the present application corresponds to the acrylate diesters of bisphenol-type compounds. These monomers may be described by the formula:

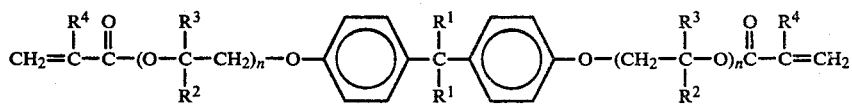

where $R^1$ is methyl, ethyl, carboxyl or hydrogen; $R^2$ is hydrogen, methyl or ethyl; $R^3$ is hydrogen, methyl or hydroxyl; $R^4$ is hydrogen, chlorine, methyl or ethyl; and n is an integer of from 0 to 8.

Representative monomers of the above-described class include dimethacrylate and diacrylate esters of 4,4'-bishydroxy-ethoxy-bisphenol A; dimethacrylate and diacrylate esters of bisphenol A; etc. These monomers are essentially described in Japanese Pat. Publication 70-15640.

The fifth class of monomers consists of monofunctional acrylate and methacrylate esters and the hydroxy-, amido-, cyano-, chloro-, and silane-substituted derivatives thereof. Such monomers include, for example, methyl acrylate, methyl methacrylate, ethyl acrylate, ethyl methacrylate, hydroxyethyl methacrylate, hydroxypropyl acrylate, hydroxypropyl methacrylate, butyl acrylate, n-octyl acrylate, 2-ethylhexyl acrylate, decyl methacrylate, dodecyl methacrylate, cyclohexyl methacrylate, tert.-butyl methacrylate, acrylamide, N-methylolacrylamide, diacetone acrylamide, N-tert.-butyl acrylamide, N-tert.-octyl acrylamide, N-butoxyacrylamide, gamma-methacryloxypropyl trimethoxysilane, 2-cyanoethyl acrylate, 3-cyanopropyl acrylate, tetrahydrofurfuryl chloroacrylate, glycidyl acrylate, glycidyl methacrylate, the norbornane-substituted acrylates or methacrylates, and the like.

The monomers useful herein are seen to be anaerobically curable monomers having one or more polymerizable acrylate or substituted acrylate ester groups as a common, unifying characteristic. The preferred monomers are those in the first and fifth classes above described.

In the production of anaerobic curing adhesive compositions characterized by exceptionally high bond strength in the resultant cured polymer, the particular monomer employed may be chosen so as to contain an alcoholic or other relatively polar group substituted thereon. Examples of such polar groups in addition to the hydroxyl group include amino, amido, cyano, carboxy and halogen polar groups. Monomers containing hydroxyl groups and/or labile hydrogen atoms are preferred. Examples of acrylic monomers within this category include hydroxyethyl acrylate, hydroxypropyl acrylate, hydroxyethyl methacrylate, hydroxypropyl methacrylate, diacetone acrylamide, 2-cyanoethyl acrylate, 3-cyanopropyl acrylate, 2-chloroethyl acrylate, glycerol monomethacrylate, 2-hydroxy-3-chloropropyl methacrylate, etc.

For best results in terms of adhesive activity, the monomers herein are preferably employed in a purified state. However, this is not a strict requirement, and the monomers may be comprised of commercial grades in which inhibitors, stabilizers, or other additives or impurities may be present, as well as those monomers prepared in the laboratory or on a pilot-plant scale, provided that such additives or impurities do not interfere with the functions of the essential ingredients of the adhesive and do not reduce the activity and/or stability of the adhesive to unacceptable levels.

In the preparation of the anaerobic curing compositions herein, it is possible to employ a mixture of acrylate ester monomers rather than a single acrylate ester as the required polymerizable monomer. There may also be utilized, in combination therewith, other non-acrylic, ethylenically unsaturated copolymerizable comonomers such as unsaturated hydrocarbons, unsaturated esters and ethers, vinyl esters, and the like. Typical optional comonomers include vinyl acetate, methyl vinyl ether, methyl vinyl ketone, poly(ethylene maleate), allyl alcohol, allyl acetate, 1-octene, styrene, etc. Preferably, the total optional nonacrylic monomer(s) will constitute no more than 50% by weight of the monomeric composition, and most preferably no more than 30%.

In accordance with the present invention, an accelerator system consisting of an N-substituted sulfonamide and an aromatic tertiary amine must be present in the composition. The N-substituted sulfonamide is defined herein by the formula given hereinabove wherein R may be an alkyl, cycloalkyl or aryl radical and may be unsubstituted or substituted with, for example, alkyl, alkenyl, halogen, dialkylamino or acetamide radicals. The N-substituted sulfonamides which are particularly preferred herein are N-tosyl-p-toluene sulfonamide, N-mesyl-p-toluene sulfonamide, N-mesyl-benzene sulfonamide, N-mesyl-methane sulfonamide, and N-benzene sulfonyl-benzene sulfonamide.

The other necessary component of the accelerator system of the present composition, the aromatic tertiary amine, is already known to accelerate cure of anaerobic adhesives in conjunction with saccharin (see, e.g., U.S. Pat. Nos. 3,218,305 and 3,795,641). Suitable aromatic tertiary amines herein include the N,N-dialkyl aryl amines and N,N-dialkyl substituted aryl amines of the general formula:

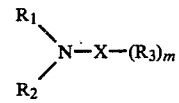

wherein X represents a carbocyclic aromatic nucleus selected from the group consisting of phenyl and naphthyl radicals; $R_1$ and $R_2$ are lower alkyl radicals of 1 to 4 carbon atoms, inclusive; $R_3$ is a member selected from the group consisting of lower alkyl and lower alkoxy radicals of 1 to 4 carbon atoms, inclusive; and m is an integer of from 0 to 7, inclusive. Examples of such amines include N,N-dimethylaniline, N,N-diethylaniline, p-isopropyl-N,N-dimethylaniline, p-methoxy-N,N-dimethylaniline, N,N-dimethyl-p-toluidine, N,N-dimethyl-o-toluidine, N,N-dimethyl-m-toluidine, N,N-diethyl-p-toluidine, 2,4-, 3,4- and 3,5-dimethyl-N,N-dimethylaniline, and the like, as well as mixtures thereof. In general, amines with a low degree of volatility and toxicity are preferred, with N,N-dimethyl-p-toluidine being most preferred.

It has been found if either the N-substituted sulfonamide or the aromatic tertiary amine is excluded from the mixture herein, a suitable product having the desired activity and stability is not obtained. In addition, aromatic secondary amines or aliphatic amines cannot be substituted for the aromatic tertiary amines.

As to proportions, the N-substituted sulfonamide and aromatic tertiary amine are employed in amounts which are interdependent, and also dependent on the type of monomer employed, the type and amount of inhibitor and chelator used, the solubility of the sulfonamide and amine, and the properties desired in the final adhesive. The maximum amount added depends on the saturation level of the monomer. The lower limit on the concentration of N-substituted sulfonamide is the minimum amount which is effective in achieving the desired results. The amount of sulfonamide employed generally ranges from about 0.01 to about 12% by weight of the total composition, and preferably 0.1–8%. The aromatic tertiary amine is employed in amounts which also depend on compatibility with or solubility in the monomer, but this amount must be at least effective in providing the adhesive with the necessary properties. Ordinarily, the concentration of tertiary amine ranges from about 0.01 to 5%, by weight of the total composition, depending on the monomer employed, and preferably 0.01–3%. It will be obvious to those skilled in the art to limit these relative proportions so that separation or precipitation will not occur during storage. Specific proportions are illustrated in the examples set forth hereinbelow.

An essential requirement in obtaining the excellent storage stability which characterizes the products herein is that the adhesive mixture contain an inhibitor of free radical polymerization. Suitable such inhibitors include those which are conventionally employed as stabilizers in anaerobic adhesives such as hydroquinones, benzoquinones, naphthoquinones, p-t-butyl catechol, phenothiazine, sterically hindered phenols, etc. With certain of these inhibitors, a longer heating period and/or larger amounts of N-substituted sulfonamide may be necessary to obtain an adhesive composition having good performance.

The amount of inhibitor employed depends, for example, on the type of monomer, but generally ranges from 0.0001 to 0.1% by weight, based on monomer, and preferably 0.0025 to 0.05%. While the monomer will normally be obtained with a certain amount of inhibitor present therein, additional inhibitor may be added as necessary at any time to bring the amount up to the required level. In the case where the monomer is subjected to elevated temperatures, the required amount of inhibitor should be present prior to heating of the mixture.

The presence of a chelating agent (chelator) has also been found necessary to provide the compositions herein with sufficient stability. For purposes herein, a chelator is defined as a compound which is capable of complexing with a metal atom through coordination bonds between the metal and the ligand atoms of the chelator to form a heterocyclic ring. Although many chelating agents are usable herein, the preferred chelators are oxalic acid and those compounds having a combination of oxygen and nitrogen ligand atoms such as 8hydroxyquinoline and the α-and beta-aminocarboxylates such as, e.g., tetrasodium ethylenediamine tetraacetic acid ($Na_4ETDA$). In general, the chelator useful in this invention should be soluble in the monomer.

An example of a type of chelator which is not useful herein is the class where all ligand atoms are nitrogen, such as, e.g., dipyridyl, as described in U.S. Pat. No. 4,038,475.

The amount of chelator employed depends mainly on the type of chelator, but also to a minor extent on the amounts and types of other ingredients in the composition. Amounts from about 0.0001% to about 0.1% by weight of the total composition may be employed, depending on the particular chelator added. It is noted that with certain chelators, the amount thereof must not exceed about 0.01% by weight to obtain an adhesive having good properties. When these chelators are added in amounts above this limit, the bond strength of the adhesive decreases dramatically. The practitioner will readily discover which chelators may be added in which amounts to best advantage. The lower limit of chelator is determined by the minimum stability desired in the composition. Preferred amounts of chelator range from 0.001 to 0.02% by weight.

Since the N-substituted sulfonamide, aromatic tertiary amine and chelator employed herein are generally very soluble in the acrylate- and methacrylate-based monomeric systems, it is usually unnecessary to employ a solvent or diluent in order to produce a satisfactory adhesive or sealant composition. If, however, the presence of a solvent is desired, then any solvent or diluent which dissolves the inhibitor, chelator, N-substituted sulfonamide and tertiary amine, as well as any accelerators which may be present and are soluble in the monomer, may be employed. Common solvents are described in the literature and include, for example, alkanols, such as methanol, ethanol and butanol, the substituted or unsubstituted formamides such as formamide and N,N-dimethyl formamide, and polyester diluents.

One additive which may be employed for purposes of increasing stability of the composition is an aliphatic tertiary amine, such as trialkylamine wherein each alkyl group contains 1–4 carbon atoms and may have hydroxyl substitution. Suitable such amines are, for example, trimethylamine, triethylamine, diethylpropylamine, tripropylamine, tri-iso-propylamine, tri-n-butylamine, tri-iso-butylamine, tri-t-butylamine, triethanolamine, ethyldimethylamine and 2-diethylaminoethanol. Such aliphatic amines, if added, must be present in amounts not exceeding the molar concentration of the sulfonamide in the monomeric composition. If a stoichiometric excess of these amines is present, a suitable adhesive composition will not be obtained. It is to be understood that these aliphatic amines cannot be used as substitutes for the aromatic tertiary amines required herein, as the former alone will not provide the needed activity for the adhesive. They are therefore employed only in conjunction with the aromatic amines.

In the production of the novel anaerobic curing compositions herein it may also be desirable to employ conventional antioxidants to prolong the shelf life of the composition further. In particular, it may be preferred to add a sterically hindered phenol, e.g., butylated hydroxytoluene (BHT), butylated hydroxyanisole (BHA), or such antioxidants as are commercially available under the registered trademarks IONOX 220 (Shell), SANTONOX R (Monsanto), IRGANOX 1010, and IRGANOX 1076 (Ciba-Geigy).

Optionally, the compositions may also contain a minor amount, up to 50% by weight, of a polymeric thickener, for example, a polymer or prepolymer of low or high molecular weight. Illustrative of such polymeric thickeners is a commercially available methacrylate polymer sold by E. I. duPont de Nemours and Company, under the trademark ELVACITE or by Rohm and Haas, under the registered trademark ACRYLOID, as well as styrene-methyl methacrylate copolymers and polybisphenol A maleate (sold by ICI Americas Inc. under the registered trademark ATLAC). There can also be added inert filling materials such as finely divided silica, montmorillonite, clay, bentonite, and the like. In particular, the use of micronized silica results in paste-like, thixotropic compositions.

The compositions of this invention may also incorporate, as auxiliary accelerators of polymerization, organic acids, preferably organic monocarboxylic acids such as benzoic acid, paratoluic acid or naphthyl acetic acid, or their corresponding anhydrides. Anhydrides of dibasic aromatic acids, such as phthalic or terephthalic acid, may also be used. Aliphatic acids, are, in general, less satisfactory as accelerators for the compositions herein when the compositions are employed on many nonferrous metal surfaces. However, these acids have some utility when the compositions are employed on ferrous metals and may conveniently be employed in conjunction with aromatic acids for bonding non-ferrous surfaces.

Improved shear strength and impact strength may be obtained in the present adhesive composition by the addition thereto of a rubber having one or more reactive centers as described in U.S. Pat. No. 4,138,449. Suitable such rubbers include polybutadienes, urethanized polybutadiene, halogenated polybutadienes, chlorosulfonated polyethylenes, and butadiene-acrylonitrile copolymer esters of acrylic acid and 2-alkylsubstituted acrylic acid.

There may also be present in the compositions plasticizers such as, for example, dibutyl or dioctyl phthalates, triethylene glycol, or polyethylene glycol dilaurate. In addition, tackifying resins such as styrene/alpha-methylstyrene copolymer (trademark KRISTALEX of Hercules) may be employed. Other optional ingredients include adhesive agents, inorganic thickeners and cut-glass fibers, as well as visible dyes or ultraviolet fluorescent dyes and/or fluorescent agents. The dyes serve to increase the visibility of the normally colorless or very pale compositions so that treated surfaces can be readily distinguished from untreated surfaces. Typical dyes include those of the anthraquinone series such as 1,4-dimonomethylaminoanthraquinone. Dyestuffs containing unsubstituted hydroxyl groups or unsubstituted amino groups are in general to be avoided, since they exert a marked inhibiting influence on the polymerization of the compositions.

As mentioned above, the compositions herein require no externally added polymerization initiator such as hydrogen peroxide, peroxy compounds, sulfones or diazonium salts to promote polymerization of the monomer. It is unexpected that a commercially acceptable anaerobic composition can be formulated by the proper balance of an N-substituted sulfonamide and an aromatic tertiary amine to provide the requisite activity and bond strength together with shelf stability, without the use of any of the polymerization initiators or the passing of an oxygen-bearing stream through the mixture as taught by the prior art.

In the preparation of the present anaerobic curing composition (before the heating step if heating is employed), it is first necessary to stir the desired amounts of N-substituted sulfonamide thoroughly with the selected acrylate ester monomer(s) usually containing an inhibitor and thereafter adding the tertiary amine and mixing until all components are dissolved to form a homogeneous mixture. It may take up to seven hours or more of stirring to effect dissolution of the ingredients, depending on the amounts and types of ingredients and the diluent employed, if any. The chelator and any optional ingredients can be premixed into the monomer or alternatively admixed into the prepared composition or during subsequent stirring and/or heating of the monomeric mixture. The chelator is preferably added with the N-substituted sulfonamide.

After the components are thoroughly mixed together, the resultant homogeneous blend is subjected to stirring and/or heating at a temperature and for a period of time sufficient to provide the composition with anaerobic during properties; i.e., rapid and spontaneous polymerization to the solid state upon the exclusion of air or oxygen while remaining in the liquid state so long as contact with air or oxygen is maintained. The reaction temperature depends mainly on the type of monomer employed, the amounts and types of ingredients added, the rate of stirring employed, if any, and the amount of stability and activity desired in the final adhesive. In any case, the temperature should not be below room temperature (about 20° C., but preferably 25° C.) to obtain a product having acceptable properties in a reasonable period of time. The maximum temperature is ordinarily about 98°–100° C. but may be several degrees higher depending on the amount and type of amine employed, the monomer, and the heating time. The heating must be carried out at a temperature such that no deleterious effects are observed in the final product, and such that the product has the minimum active oxygen content specified herein. The preferred heating temperature herein is 45°–80° C. The period of time necessary for heating will depend, e.g., on the temperature, ingredients, and the rate of stirring, if any, but generally ranges from about 4 to about 50 hours, preferably 10–30 hours. The time may be extended beyond 50 hours if necessary to improve the activity of the adhesive. If the heating period is too long, however, the stability of the adhesive may be adversely affected. It is also within the scope of this invention, although less desirable, to allow the homogeneous mixture to stand at room temperature without stirring; nevertheless, the amount of time necessary for the adhesive to develop anaerobic curing properties will be increased proportionately, and in some cases may be three months or longer.

The formation of the adhesive is preferably monitored during the heating and/or stirring period by determination of the active oxygen content of the intermediates and the final product. To this end, a small sample of the developing adhesive is removed and analyzed for active oxygen content as described further hereinbelow. Generally, the amount of active oxygen introduced into the monomeric mixture is between about 50 ppm. and about 1000 ppm., and preferably at least 100 ppm. For purposes herein, the minimum amount of active oxygen necessary to achieve sufficient stabilization of the adhesive is 25 ppm., based on the total composition.

During the heating and/or stirring period no oxygen need be actively passed through the mixture such as by bubbling an oxygen-bearing gas therethrough. The heating may be carried out in a conventional reaction vessel for anaerobic adhesives equipped with stirrer or may be carried out in a suitable reactor with no stirring. Stirring of the mixture is preferred because ambient oxygen becomes mixed into the vortex created by the stirring, resulting in shorter reaction times.

Depending on the particular ingredients and the temperature and time allowed for heating and/or stirring, the composition herein may be stored at room temperature for periods of months and in some cases even years prior to actual use without any evidence of gelling. It is only necessary that there be present a moderate amount of air or oxygen, which is provided conveniently by a small volume of air in a properly shaped container, preferably made of polyethylene or a similar material which is permeable to air. However, upon exclusion from air by placement between adjacent surfaces, the composition will rapidly polymerize to form a strong bond, which polymerization can be further accelerated by use of elevated temperatures, although use of elevated temperatures is not necessary since these compositions produce strong bonds within a matter of minutes.

The anaerobic polymerization of the compositions herein is accelerated by the surface of certain metals including iron, mild steel, cadmium, cobalt and manganese. Certain other metals, including aluminum, zinc and copper, have a lower catalytic activity. Non-metallic surfaces such as glass do not catalyze polymerization. In the bonding of surfaces of low catalytic activity, it may be advantageous to use a primer such as an aldehyde-amine condensate (e.g., those primers represented in U.S. Pat. No. 3,616,040 to Toback), a derivative of a catalyst metal such as ferric chloride, cobalt naphthanate or manganese resinate, or an aerosol-propelled primer based on a sulfone and an organic salt of copper as described in U.S. pat. appln. Ser. No. 953,054, filed Oct. 19, 1978 to Ray-Chaudhuri et al.

In certain laminating applications, it may be desirable to add a peroxy initiator to the adhesive to improve the adhesive properties thereof. For example, in applications which are not thread locking, such as in bonding glass to metal sheets or glass to glass, it may be advantageous to add to the adhesive composition, any time during preparation thereof or after preparation, a small but effective amount (i.e., about 0.5–5% by weight, based on total composition) of a dialkyl peroxide such as 2,5-dimethyl-2,5-bis(t-butylperoxy) hexane, di-(t-butyl) peroxide, or the like. It is noted herein that the addition of dialkyl peroxide does not improve the cure speed of the adhesive composition. It is unexpected that addition of a dialkyl peroxide improves the adhesive properties such as tensile shear and impact strength of the adhesive composition.

In bonding of black oxide coated bolts or other inactive surfaces, it may be desirable to add to the adhesive containing the oxygenated monomer, a hydroperoxide such as cumene hydroperoxide, t-butyl hydroperoxide or methylethyl ketone hydroperoxide. Such an additive, when added in an effective amount to the adhesive after the mixture has been subjected to the above conditions, serves to improve the thread-locking properties of the black oxide coated bolts.

The compositions herein are particularly suitable for use as locking compounds for cementing nuts to threaded shafts, bushes to bush housings and the like. In many cases they can be applied either before or after assembly of the components. For application after assembly, an unthickened composition which is sufficiently fluid to penetrate between the components is preferred. If the compositions are applied to components prior to assembly, the unassembled, coated components can be stored in air for considerable periods up to several months, since the contact with atmospheric oxygen is sufficient to inhibit polymerization even when the coated surface is anaerobically catalytic such as iron. When such previously coated components are assembled so as to exclude air, however, polymerization will be initiated and a considerable bond strength will normally develop within a few hours, even at room temperature.

The following test procedures were employed in the examples below:

Determination of Active Oxygen Content

About 0.1 to 0.5 g. of the sample is weighed in a small glass flask to which is added about 10 ml. glacial acetic acid. A pellet of dry ice about the size of a large pea is placed in the solution to dispel air. When about one-half of the dry ice has evaporated, 1 ml. of a saturated aqueous solution of potassium iodide is added and the flask swirled to dissolve the ingredients. A loosely fitting cork is placed in the flask to retain the inert atmosphere and the mixture is heated for about 15 minutes in a 60° C. oven. Immediately after removal of the flask from the oven, 10 ml. of water is added to prevent interference of air. The warm solution is promptly titrated with 0.1 N sodium thiosulfate until the color of the iodine just disappears. Starch indicator should not be added. The active oxygen content is obtained using the formula:

$$\frac{(\text{ml. of } 0.1N \text{ Na}_2\text{S}_2\text{O}_3) \times (0.08 \times 10^4)}{\text{weight (g.) of sample}} = \text{ppm. of active oxygen}$$

Determination of Shelf Stability (Gel Time)

A 5 cc. sample of the composition is added to a test tube, which is then placed in a bath heated to 82° C. for a minimum of 30 minutes. As an approximate correlation between oven-aging and aging at room temperature, it is believed that a sample still free from gelling after more than 24 hours of aging will be stable at ambient temperatures in the presence of oxygen for at least about one year.

Determination of Break Torque and Average Prevailing Torque

The strength of the bond between threaded members is determined as follows: About two or three drops of each composition are placed on the exposed threads of separate $\frac{3}{8} \times 24$ mild steel Class II fit bols (degreased), and immediately thereafter a nut (degreased) with mating threads is run onto the bolt so that the nut is directly in the thread area of the applied composition. The sealant is allowed to set and cure at room temperature for a specified period of time, normally $\frac{1}{2}$, 1 or 24 hours, and the strength of the bond formed between the nut and bolt is then measured. The break torque for the bond is the amount of torque required for a wrench to remove the nut on the threads initially. The average prevailing torque for the bond is the average amount of torque required for a wrench to turn a series of three bolts for $\frac{1}{4}$ turn, $\frac{1}{2}$ turn, 3/4 turn and a full turn. Commercially, a bolt sealant developing an average torque of 12 inch-pounds after 24 hours of cure is considered satisfactory.

Determination of Tensile Shear and Impact Strength

These strength properties in the adhesive were determined according to the ASTM Standard Method of Test Designation D 950-72 (1973) for the impact strength and D 1002-72 (1973) for the tensile shear strength.

The following examples serve to illustrate further the embodiments of the present invention. In the examples, all parts and percentages are given by weight and all temperatures in degrees Celsius unless otherwise noted.

EXAMPLE 1

A wide-mouth, quart-size bottle of high-density polyethylene, fitted with a non-metallic stirrer and a thermometer, was charged with 98.6 parts tetraethyleneglycol dimethylacrylate (stabilized with about 75 ppm. phenothiazine) and 0.0025 parts tetrasodium salt of EDTA. The resultant mixture was heated to 65° C., then 0.93 parts N-mesyl-methane sulfonamide was added thereto, and the mixture stirred for about 15 minutes. After this period 0.44 parts N,N-diethyl-p-toluidine was added slowly over a period of 5 to 10 minutes and the reaction run at 65° C. for about 22 hours with stirring. The active oxygen contents and torque values were determined for both the freshly prepared samples and for samples which had been aged in a polyethylene container in an oven at 50° C. for 34 days. The active oxygen content of the fresh sample was 77 ppm. and of the aged sample 360 ppm. The torque values are indicated in Table I below.

TABLE I

|  | Fresh Sample | | Aged Sample | |
| --- | --- | --- | --- | --- |
|  | 30 min. | 24 hrs. | 30 min. | 24 hrs. |
| Break Torque (in.-lb.) | 50–75 | 100–125 | 50–75 | 75–100 |
| Average Prevailing torque (in.-lb.) | 277 | 323 | 377 | 400 |

The results show that the N-mesyl-methane sulfonamide/N,N-diethyl-p-toluidine accelerator system provides good anaerobic properties both in the fresh sample and aged samples.

EXAMPLES 2–9

These examples illustrate the use of varying N-substituted sulfonamides and aromatic tertiary amines as accelerator systems for anaerobic adhesive formulations containing tetraethyleneglycol dimethacrylate prepared as described in Example 1 under varying reaction conditions. The ingredients, reaction conditions, and properties of the adhesives are given in Table II. The viscosity of each formulation was about 25 cps., except for Example 8, of which the viscosity was about 9000. The gel time of each formulation at 82° C. was greater than 24 hours in all cases. It can be seen that the adhesives herein do not exhibit a drop in activity upon aging for ten days at 50° C. The formulations of Examples 7 and 8, in fact, exhibit no decrease in performance after aging for 30 days at 50° C.

EXAMPLES 10–17

These examples illustrate the use of different monomers under varying conditions using the procedure for preparation described in Example 1. Unless otherwise indicated, the monomers are all initially stabilized with hydroquinone. The viscosity of each formulation was about 25 cps. and the gel time at 82° C. was greater than 24 hours in all cases. The ingredients, reaction conditions and properties of the adhesives are given in Table III.

EXAMPLE 18

This example illustrates the preparation of additional anaerobic adhesives containing various additives and having different viscosity levels.

The procedure of Example 1 was employed to prepare anaerobic adhesives with the following ingredients, reaction conditions and properties:

| Ingredients: (parts) | Sample A | Sample B |
| --- | --- | --- |
| Tetraethyleneglycol dimethacrylate (stabilized with hydroquinone) | 69.28 | 66.24 |
| Hydroxyethyl methacrylate | 15.87 | 15.18 |
| Polybisphenol A maleate thickener | 3.15 | 3.13 |
| Acrylic copolymer thickener | 2.69 | 6.60 |
| Adhesive agent | 6.31 | 6.26 |
| EDTA (sodium salt) | 0.0075 | 0.0075 |
| N-Mesyl-p-toluene sulfonamide | 2.11 | 2.02 |
| N,N-Dimethyl-p-toluidine | 0.56 | 0.54 |
| Dye | 0.005 | 0.010 |
| Fluorescent agent | 0.005 | 0.005 |
| Reaction conditions: | | |
| Temperature (°C.) | 63–64 | 63–66 |
| Time (hours) | 27.5 | 27.5 |

TABLE II

| | Examples | | | | | | | |
| --- | --- | --- | --- | --- | --- | --- | --- | --- |
| Ingredients: (parts) | 2 | 3 | 4 | 5 | 6 | 7 | 8 | 9 |
| Tetraethyleneglycol dimethacrylate (stabilized with phenothiazine) | 98.70 | 97.44 | — | 98.05 | 98.74 | 97.87 | 51.93 | 97.56 |
| Tetraethyleneglycol dimethacrylate (stabilized with hydroquinone) | — | — | 98.75 | — | — | — | — | — |
| Polybisphenol A maleate thickener | — | — | — | — | — | — | 44.96 | — |
| N-Tosyl-p-toluene sulfonamide | — | — | 0.88 | — | — | 1.74 | 2.56 | — |
| N-Mesyl-p-toluene sulfonamide | 0.93 | 2.02 | — | — | — | — | — | — |
| N-Mesyl-methane sulfonamide | — | — | — | — | 0.93 | — | — | — |
| N-Mesyl-benzene sulfonamide | — | — | — | — | — | — | — | 1.89 |
| N-Benzene sulfonyl-benzene sulfonamide | — | — | — | 1.59 | — | — | — | — |
| N,N-Dimethyl-p-toluidine | 0.36 | 0.54 | 0.36 | 0.36 | — | — | 0.53 | 0.54 |
| N,N-Dimethyl-aniline | — | — | — | — | 0.33 | — | — | — |
| 3,4-Dimethyl-N,N-dimethylaniline | — | — | — | — | — | 0.39 | — | — |
| EDTA (sodium salt) | 0.0025 | 0.005 | — | 0.005 | 0.005 | 0.005 | 0.005 | 0.005 |
| Oxalic acid | — | — | 0.001 | — | — | — | — | — |
| 2-Methoxy-1,4-naphthoquinone | — | 0.0025 | — | — | — | — | 0.005 | 0.0025 |
| Reaction temperature (°C.) | 50–51 | 64–65 | 49–50 | 65 | 63–65 | 49–50 | 64–66 | 65–67 |
| Reaction time (hours) | 22 | 26.5 | 22.5 | 22 | 29 | 46.5 | 25 | 27.5 |
| Active oxygen content (ppm.) | 97 | 217 | 243 | 162 | 429 | 30 | ca.64 | 215 |
| Break torque of fresh sample after 24-hour cure (in.-lb.) | 75 | 75–100 | 100 | 75–100 | 100 | 25–75 | 200 | 100–125 |
| Break torque of sample aged for 10 days at 50° C. after 24-hour cure (in.-lb.) | 75–100 | 100–125 | 50–100 | 75–125 | 75–100 | 100–150 | — | 50–75 |
| Average prevailing torque of fresh sample after 24-hour cure (in.-lb.) | 413 | 225 | 413 | 319 | 329 | 132 | 387 | 254 |
| Average prevailing torque of sample aged for 10 days at 50° C. after 24-hour cure (in.-lb.) | 429 | 400 | 364 | 265 | 221 | 388 | — | 283 |

TABLE III

| Ingredients: (parts) | 10 | 11 | 12 | 13 | 14 | 15 | 16 | 17 |
|---|---|---|---|---|---|---|---|---|
| Tetraethyleneglycol dimethacrylate (stabilized with phenothiazine) | — | — | — | — | 97.90 | 99.82 | 76.63 | — |
| Triethyleneglycol dimethacrylate | — | 97.90 | — | — | — | — | — | — |
| Trimethylolpropane trimethacrylate | 97.90 | — | — | — | — | — | — | — |
| Hydroxyethyl methacrylate | — | — | 48.95 | 97.90 | — | — | 16.82 | 9.73 |
| Bis-phenol A dimethacrylate | — | — | 48.95 | — | — | — | — | — |
| Norbornane-substituted monomer (QM 657, trademark of Rohm and Haas) | — | — | — | — | — | — | — | 87.56 |
| N-Tosyl-p-toluene sulfonamide | 1.74 | 1.74 | 1.74 | 1.74 | 1.74 | — | — | — |
| N-Mesyl-p-toluene sulfonamide | — | — | — | — | — | 0.10 | 4.67 | 1.99 |
| N,N-Dimethyl-p-toluidine | 0.36 | 0.36 | 0.36 | 0.36 | 0.36 | 0.08 | 1.87 | 0.72 |
| EDTA (sodium salt) | 0.0025 | 0.005 | 0.010 | 0.005 | 0.005 | 0.0025 | 0.005 | 0.0025 |
| Oxalic acid | 0.0025 | — | — | — | — | — | — | 0.0024 |
| 2-Methoxy-1,4-naphthoquinone | — | — | 0.005 | — | — | — | — | — |
| Reaction temperature (°C.) | 65 | 62–66 | 63–65 | 62–63 | 78–79 | 65 | 63–65 | 58–65 |
| Reaction time (hours) | 23.5 | 20 | 51 | 22 | 5.5 | 21 | 22.5 | 22.5 |
| Active oxygen content (ppm.) | 99 | 370 | 117 | 171 | 292 | 32 | 492 | 121 |
| Break torque of fresh sample after 24-hour cure (in.-lb.) | 75–100 | 75 | 125–200 | 300–325 | 75–100 | 75 | 125 | 75–200 |
| Break torque of sample aged for 10 days at 50° C. after 24-hour cure (in.-lb.) | 75 | 50–75 | 200 | 100 | 100 | 25–50 | — | — |
| Average prevailing torque of fresh sample after 24-hour cure (in.-lb.) | 452 | 242 | 246 | 288 | 197 | 144 | 354 | 194 |
| Average prevailing torque of sample aged for 10 days at 50° C. after 24-hour cure (in.-lb.) | 425 | 302 | 335 | 165 | 360 | 121 | — | — |

| Properties | Sample A | Sample B |
|---|---|---|
| Active oxygen content (ppm) | 306 | 361 |
| Viscosity (cps.) | 100 | 500 |
| Gel time at 82° C. (hours) | 24 | 24 |
| Break torque of fresh sample after 24-hour cure (in.-lb.) | 200–225 | 175–200 |
| Break torque of sample aged for 10 days at 50° C. after 24-hour cure (in.-lb.) | 200–225 | 175–250 |
| Average prevailing torque of fresh sample after 24-hour cure (in.-lb.) | 373 | 392 |
| Average prevailing torque of sample aged for 10 days at 50° C. after 24-hour cure (in.-lb.) | 379 | 367 |

EXAMPLE 19

This example illustrates the superior properties of the adhesive containing the accelerator system herein.

The following ingredients were employed in preparing two anaerobic adhesive formulations containing different accelerator systems:

| Ingredients (parts) | Samples A | B (Comparative) |
|---|---|---|
| Tetraethyleneglycol dimethacrylate (stabilized with phenothiazine) | 97.9 | 98.6 |
| EDTA (sodium salt) | 0.0025 | 0.0025 |
| N-Tosyl-p-toluene sulfonamide | 1.74 (0.0053 mole) | — |
| Saccharin | — | 0.99 (0.0054 mole) |
| N,N-Dimethyl-p-toluidine | 0.36 | 0.36 |
| EDTA (sodium salt)* | 0.005 | — |

*Because Sample A is more active than Sample B, additional EDTA is required in Sample A to render it stable to polymerization in the bath.

The above ingredients were reacted using the same procedure as described in Example 1 except that the reactions were run at 50° C. The active oxygen contents of Samples A and B after about 24 hours of reaction at 50° C. were 74 and 38 ppm., respectively. The additional EDTA (0.005 parts) was added to Sample A at the end of the reaction.

Five milliliters of each of the above samples were added to 15-ml. test tubes which were then placed in a bath maintained at 82° C. ±2° C. After heating for 72 hours, the samples were removed from the bath and cooled to room temperature. After cooling the samples were each tested for thread-locking properties as were fresh (unaged) samples of each as a reference point. The results are given in Table IV.

TABLE IV

| | Torque (in.-lb.) | | | |
|---|---|---|---|---|
| | 30 min. cure | | 60 min. cure | |
| Sample | Break | Average | Break | Average |
| A (unaged) | 50 | 338 | 75–125 | 338 |
| B (unaged) (comparative) | 50 | 229 | 50 | 406 |
| A (aged) | 5–30 | 69 | 25–75 | 233 |
| B (aged) (comparative) | 0 | 0 | 0 | 0 |

The above results indicate that the accelerator system of this invention maintains the cure speed of the adhesive significantly more than the saccharin-amine accelerator system of the prior art after aging the adhesive. The active oxygen contents of the two adhesives show that the accelerator system of this invention is significantly more effective than the saccharin-based accelerator system in generating active oxygen in the adhesive under the same conditions.

EXAMPLE 20

This example illustrates the use of a urethane dimethyacrylate monomer in the adhesive system of the present invention.

An adhesive formulation was prepared as described in Example 1 employing the following ingredients and reaction conditions, and having the following properties:

| Ingredients: (parts) | |
|---|---|
| Urethane dimethacrylate in hydroxyethylmethacrylate as 75% solids (stabilized with hydroquinone) | 63.92 |
| Hydroxyethyl methacrylate | 26.54 |
| Methacrylic acid | 6.33 |
| EDTA (sodium salt) | 0.005 |
| Adhesive agent | 0.35 |
| N-Mesyl-p-toluene sulfonamide | 2.25 |
| N,N-Dimethyl-p-toluidine | 0.60 |
| Reaction Conditions: | |
| Temperature (°C.) | 61–69 |
| Time (hours) | 22 |
| Properties: | |
| Active oxygen content (ppm.) | 150 |
| Viscosity (cps.) | ca. 1200 |
| Break torque of fresh sample after 24-hour cure (in.-lb.) | 125–225 |
| Average prevailing torque of fresh sample after 24-hour cure (in.-lb.) | 204 |
| Tensile shear strength between two primed mild steel bars of 0.5 in. by 4 in. (psi.) | 2600 |
| Impact strength (ft.-lb./in.²) | 1.5 |
| Cure time between glass slides primed with a primer containing sulfone and an organic salt of copper (sec.) | 10 |

The above data indicate that the present accelerator system works well in anaerobic adhesives based on a monomeric mixture of urethane dimethacrylate and hydroxyethyl methacrylate.

EXAMPLE 21

This example illustrates the use of dialkyl peroxide to improve the adhesive properties in applications such as in bonding steel to steel.

An anaerobic adhesive was prepared by mixing together 49 parts of the adhesive of Example 20 with 1 part of 2,5-dimethyl-2,5-bis(t-butyl peroxy) hexane in a 2-oz. screw-capped bottle made from low-density polyethylene. The mixture was rolled overnight and then evaluated against the adhesive of Example 20 for tensile shear strength and impact strength on mild steel bars primed with an aerosol primer containing sulfone and an organic salt of copper. The results are shown in Table V.

TABLE V

| Adhesive | Tensile Shear Strength (psi.) | Impact Strength (ft.-lb./in.²) |
|---|---|---|
| Example 20 | 2650 | 1.6 |
| Example 21 | 2990 | 7.7 |

The above data indicate that small amounts of dialkyl peroxide added to the adhesive of this invention significantly improve the adhesive properties in bonding metal to metal. When the peroxide is added to the formulation which does not contain the accelerator system, no curing of the primed steel bars is effected.

EXAMPLE 22

A formulation similar to Example 2 is prepared using as monomer poly(butylene maleate) dimethacrylate and yields roughly comparable results.

It is summarized that the present invention provides an anaerobic curing adhesive composition which is characterized by superior stability and cure speed, the adhesive being prepared from a homogeneous mixture containing an N-substituted sulfonamide which may be formed without any added polymerization initiator and which does not require constant passage of gaseous oxygen therethrough either during preparation of the adhesive or during storage thereof.

Now that the preferred embodiments of the invention have been described in detail, various modifications and improvements thereon will become readily apparent to those skilled in the art. Accordingly, the spirit and scope of the present invention are to be limited only by the appended claims, and not by the foregoing specification.

What is claimed is:

1. In a process for preparing an anaerobic curing composition of the type wherein a homogeneous mixture is formed consisting essentially of at least one polymerizable acrylate ester, a free-radical inhibitor, a chelator and an accelerator system, and wherein said mixture is maintained at a temperature of at least about 20° C. for a period of time sufficient to provide said composition with anaerobic curing properties and with at least 25 ppm. of active oxygen, the improvement which comprises incorporating in the composition as the accelerator system therefor at least an effective amount of an aromatic tertiary amine and an N-substituted sulfonamide of the general formula:

$$R-SO_2-NH-SO_2-R$$

wherein the R groups independently represent an unsubstituted or substituted hydrocarbon radical.

2. The process of claim 1 wherein said polymerizable monomer is

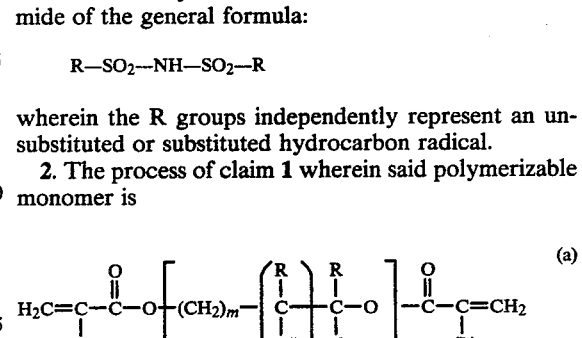

wherein R is selected from the group consisting of hydrogen, methyl, ethyl, $$-CH_2OH \text{ and } -CH_2-O-\overset{O}{\underset{}{C}}-\underset{R'}{C}=CH_2;$$

R' is selected from the group consisting of hydrogen, chlorine, methyl and ethyl;

R" is selected from the group consisting of hydrogen, hydroxy, and $$-O-\overset{O}{\underset{}{C}}-\underset{R'}{C}=CH_2;$$

m is an integer of from 1 to 8;
n is an integer of from 1 to 20; and
p is 0 or 1; or
(b) monofunctional acrylate and methacrylate esters or the hydroxy-, amido-, cyano-, chloro-, or silane-substituted derivatives thereof.

3. The process of claim 1 wherein said N-substituted sulfonamide is selected from the group consisting of N-tosyl-p-toluene sulfonamide, N-mesyl-p-toluene sulfonamide, N-mesyl-benzene sulfonamide, N-mesyl-methane sulfonamide and N-benzene sulfonyl-benzene sulfonamide, and wherein said aromatic tertiary amine is selected from the group consisting of N,N-dimethyl-p-toluidine, N,N-diethyl-p-toluidine, N,N-dimethylaniline and 3,4-dimethyl-N,N-dimethylaniline.

4. The process of claim 1 wherein said N-substituted sulfonamide is present in an amount of 0.01 to 12% by weight of said aromatic tertiary amine is present in an amount of 0.01 to 5% by weight, based on total composition.

5. The process of claim 1 wherein said chelator is oxalic acid or tetrasodium ethylenediamine tetraacetic acid.

6. The process of claim 1 wherein said inhibitor is present in an amount of 0.0001 to 0.1% by weight, based on monomer, and said chelator is present in an amount of 0.0001 to 0.1% by weight, based on total composition, this amount being dependent on the type of chelator.

7. The process of claim 1 wherein said mixture is maintained at a temperature of between 20° and 100° C.

8. The process of claim 1 wherein said mixture is maintained at a temperature of 45°–80° C. for 10–30 hours.

9. The process of claim 1 wherein any time during preparation of said composition or after preparation thereof, a dialkyl peroxide is added thereto.

10. In an anaerobic curing composition of the type comprising a homogeneous mixture of at least one polymerizable acrylate ester, a free-radical inhibitor, a chelator and an accelerator system, which mixture is maintained at a temperature of at least about 20° C. for a period of time sufficient to provide said composition with anaerobic curing properties and with at least 25 ppm. of active oxygen, the improvement which comprises incorporating in said composition as the accelerator system therefor at least an effective amount of an aromatic tertiary amine and an N-substituted sulfonamide of the general formula:

$$R—SO_2—NH—SO_2—R$$

wherein the R groups independently represent an unsubstituted or substituted hydrocarbon radical.

11. The composition of claim 10 wherein said N-substituted sulfonamide is selected from the group consisting of N-tosyl-p-toluene sulfonamide, N-mesyl-p-toluene sulfonamide, N-mesyl-benzene sulfonamide, N-mesylmethane sulfonamide and N-benzene sulfonylbenzene sulfonamide, and wherein said aromatic tertiary amine is selected from the group consisting of N,N-dimethyl-p-toluidine, N,N-diethyl-p-toluidine, N,N-dimethylaniline and 3,4-dimethyl-N,N-dimethylaniline.

12. The composition of claim 10 wherein said N-substituted sulfonamide is present in an amount of 0.1 to 8% by weight and said aromatic tertiary amine is present in an amount of 0.01 to 3% by weight, based on total composition.

13. The composition of claim 10 which additionally contains a dialkyl peroxide.

14. The composition of claim 10 wherein said chelator is oxalic acid or tetrasodium ethylenediamine tetraacetic acid.

* * * * *